US008453121B2

(12) United States Patent  (10) Patent No.: US 8,453,121 B2
Birkill et al.  (45) Date of Patent: May 28, 2013

(54) MANAGING THE TRACING OF THE EXECUTION OF A COMPUTER PROGRAM

(75) Inventors: Alexis Birkill, Winchester (GB); George Meldrum Blue, Southampton (GB); Philip Graham Willoughby, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 1329 days.

(21) Appl. No.: 12/132,024

(22) Filed: Jun. 3, 2008

(65) Prior Publication Data
US 2009/0113398 A1  Apr. 30, 2009

(30) Foreign Application Priority Data
Oct. 25, 2007 (EP) .................................. 07119273

(51) Int. Cl.
*G06F 9/44* (2006.01)
(52) U.S. Cl.
USPC .......................................... 717/128; 717/127
(58) Field of Classification Search
USPC ................................................ 717/128, 127
See application file for complete search history.

(56) References Cited

U.S. PATENT DOCUMENTS
7,058,928 B2 * 6/2006 Wygodny et al. ............. 717/128

OTHER PUBLICATIONS

Netzer, et al. "Optimal Tracing and Replay For Debugging Messge-Passing Parallel Programs", 1992, IEEE, p. 502-511.*

* cited by examiner

*Primary Examiner* — Qamrun Nahar
(74) *Attorney, Agent, or Firm* — Brian J. Teague

(57) ABSTRACT

A method and system for the management of tracing data of interest in a data processing system comprises identifying the location and length of one or more such units of interest as each unit is stored in main memory during execution of the program and recording a logical assignment of each unit of interest to a slot in a wrap around trace buffer. Copying of the units of interest to the trace buffer is deferred unless one or more predefined events occur. Such events may include an attempt to overwrite the data which has been logically assigned or a request for information stored in the trace buffer. The recorded assignments are discarded whenever it is calculated that the capacity of the trace buffer would be exceeded resulting in the corresponding units never needing to be copied to the trace buffer.

15 Claims, 8 Drawing Sheets

MANAGING THE TRACING OF THE EXECUTION OF A COMPUTER PROGRAM

CROSS-REFERENCE TO RELATED APPLICATIONS

This application claims priority to United Kingdom Patent Application No. 07119273.6, filed Oct. 25, 2007, the contents of which are incorporated herein by reference in its entirety.

FIELD OF THE INVENTION

The present invention relates to the management of the tracing of data generated sequentially during execution of a computer program in a data processing system.

BACKGROUND OF THE INVENTION

It is a well known requirement in the field of computer programming to be able to trace the execution path of a program by the recording of key data and events. The main reason for doing this is to be able to analyse the reasons for program failure by examining the recorded trace data. Alternatively, it might be required to analyse the performance of a program. Although tracing can, in some cases, be of direct assistance to end user customers it is primarily needed by customer support staff to assist their customers and also by the programming team which has developed the program.

For these reasons, many commercially available programs are written with an inbuilt trace facility, which may be enabled by the system administrator of the executing data processing system to provide and record trace data. Such data may include data indicating the timing and sequence of program methods which are called, such as, for example, timestamps, thread identifiers and the type of trace event. One example of a program offering such a trace facility is IBM WebSphere MQ ("IBM" and "WebSphere" are trademarks of International Business Machines Corporation). Trace data may also include actual program data values in registers, at the time of failure.

Because tracing program execution requires a great deal of computer time and storage, the default situation during normal program execution is that the trace facility is disabled. When, however, the trace facility is enabled, various techniques have been used to limit the impact on performance.

The simplest is inherent in the trace facility itself in that it allows the administrator to be selective as to which components of the program are to be traced and what level of detail is required. However, the actual tracing may still be very time consuming, particularly if the data is all logged to non-volatile storage, such as hard disk storage.

It is therefore common practice to record trace data in a transient buffer of sufficient size to hold only the immediate precursor data to a failure or other execution point of interest. In some systems, this may be examined on screen but more commonly, will be recorded to disk when or before the buffer becomes full. The use of a circular (wrap-around) transient buffer is also well known so that the oldest trace data is eventually overwritten by more recent trace data. One example of this is described in an article "Storing Variable Length Data in a Circular Buffer" by W C Carlson and M C Chang (IBM Technical Disclosure Bulletin Vol. 36, No. 3, pp 491-494, March 1993).

Another more recent approach to limiting the quantity of trace data to the most relevant is described in U.S. Patent Application Publication US 2004/0250242 A1 for a "Method, System and Computer Program Product for Tracing Software Methods" by R F Berry et al (IBM). This makes use of the call stack generated when a program is run, which includes a sequentially ordered list of methods called during the running of the program. Trace information of most significance is assumed to lie between minimum and maximum offsets in the call stack. The effective trace window between these offsets is varied adaptively according to predefined rules in order to limit the generation of too much extraneous trace data.

However, this and other existing approaches all have a performance overhead caused by the copying of trace data to the trace buffer. This action, like all data storage in a modern data processing system, involves a Memory Management Unit (MMU) which is the part of the system which controls the volatile storage attached to the processor. The normal operations carried out by the MMU are Load operations, in which data is retrieved from main memory and placed in one of the CPU (processor) caches, and Store operations, in which data from cache is stored back into the main memory. A Store operation, such as the copying of trace data to a circular trace buffer, necessarily takes up additional processor cycles thus slowing down execution of the actual program.

BRIEF SUMMARY OF THE INVENTION

Accordingly, one embodiment of the present invention provides a method of managing the tracing of data of interest generated sequentially during execution of a computer program in a data processing system comprising a processor and main memory, the method comprising: identifying the location and length of one or more units of data of interest as each unit of data of interest is stored in main memory during execution of the program; recording a logical assignment of each such unit to a slot in a wrap around trace buffer in main memory; copying logically assigned data units of interest to their respective slots in the trace buffer in response to one or more predefined events; and discarding the recorded assignments of one or more data units of interest whenever the capacity of the trace buffer would be exceeded so that such units are never copied to the trace buffer.

In a second aspect, the invention also provides a data tracing management system for managing the tracing of data of interest generated sequentially during execution of a computer program in a data processing system comprising a processor, main memory, and a memory management unit (MMU) which controls the copying of data to and from the main memory; the data tracing management system comprising: means for identifying the location and length of one or more units of data of interest as each unit is stored in main memory during execution of the program; a wrap around trace buffer in main memory; trace assignment means within the MMU responsive to a trace instruction from the processor to record a logical assignment of each such unit to a slot in said wrap around trace buffer; means for copying logically assigned data units to their respective slots in the trace buffer in response to one or more predefined events; and means for discarding the recorded assignments of one or more data units of interest whenever the capacity of the trace buffer would be exceeded so that such units are never copied to the trace buffer.

Thus, by deferring the trace data copying operation to the trace buffer for as long as possible, many copies need never be made at all, as the trace data would have been overwritten in the trace buffer. This saves processor cycles directly.

One of the predefined events which can trigger copying of trace data to the trace buffer is an indication that the main memory location of a logically assigned data unit of interest is about to be overwritten. This can be treated as a subset of an MMU "store" operation.

In the case of a data processing system having an MMU which controls the copying of data to and from the main memory and at least one cache associated with the processor, the method includes flushing any lines in the cache which contain the data that will be stored in the trace buffer to main memory, and marking those lines such that the data will not be overwritten before the data is copied to the trace buffer. The cache controller can thus alert the MMU when such lines are going to be overwritten. The marking may be achieved by having an array of flags which can be set or unset, within the cache, which correspond exactly to lines in the cache.

Another predefined event also causing copying to be triggered is when a request to read the trace buffer is received.

Where, as in all current data processing systems, there is a Memory Management Unit (MMU) which controls the copying of data to and from the main memory, it is a further feature of the invention that the MMU is arranged to copy logically assigned data units of interest to the trace buffer without waiting for said one or more predefined events, if it is otherwise idle. By performing the copying in advance of its becoming necessary, a further cost saving of processor time is realised.

In addition to the method and system of managing the tracing of data of interest as described above, other aspects of the present invention are directed to corresponding computer program products for managing the tracing of data of interest.

BRIEF DESCRIPTION OF THE DRAWINGS

Figure 1:
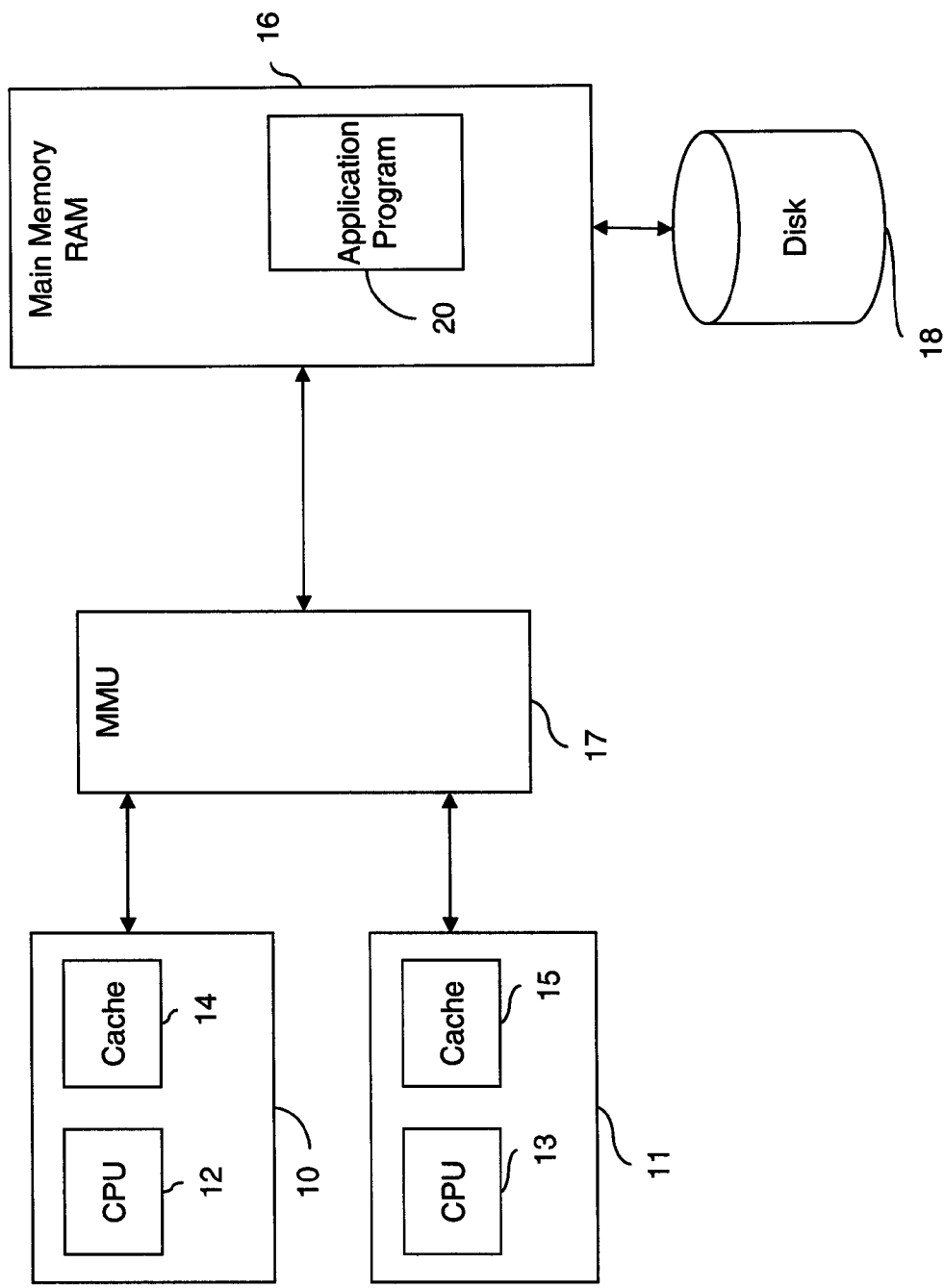
Figure 2:
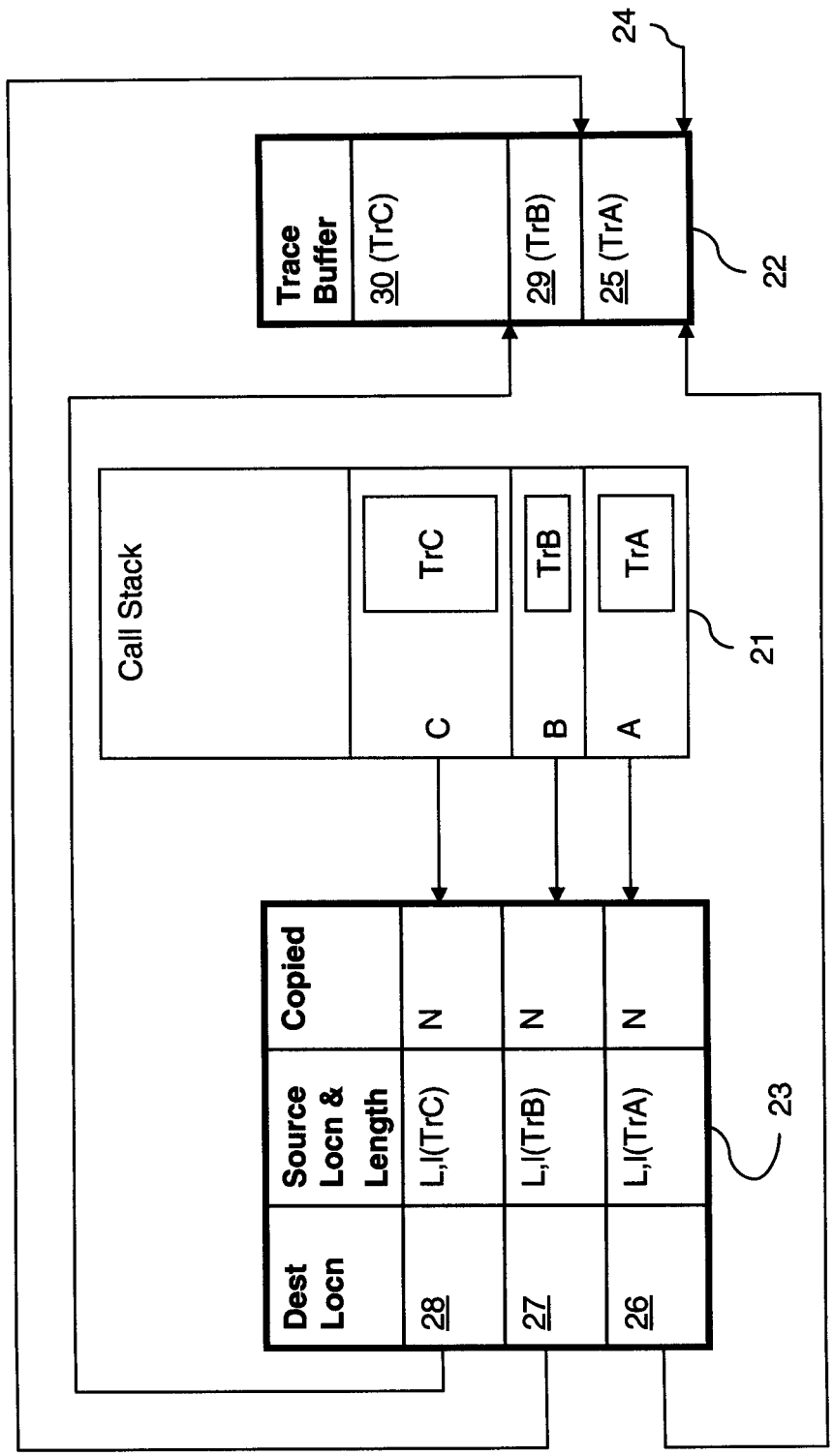
Figure 3:
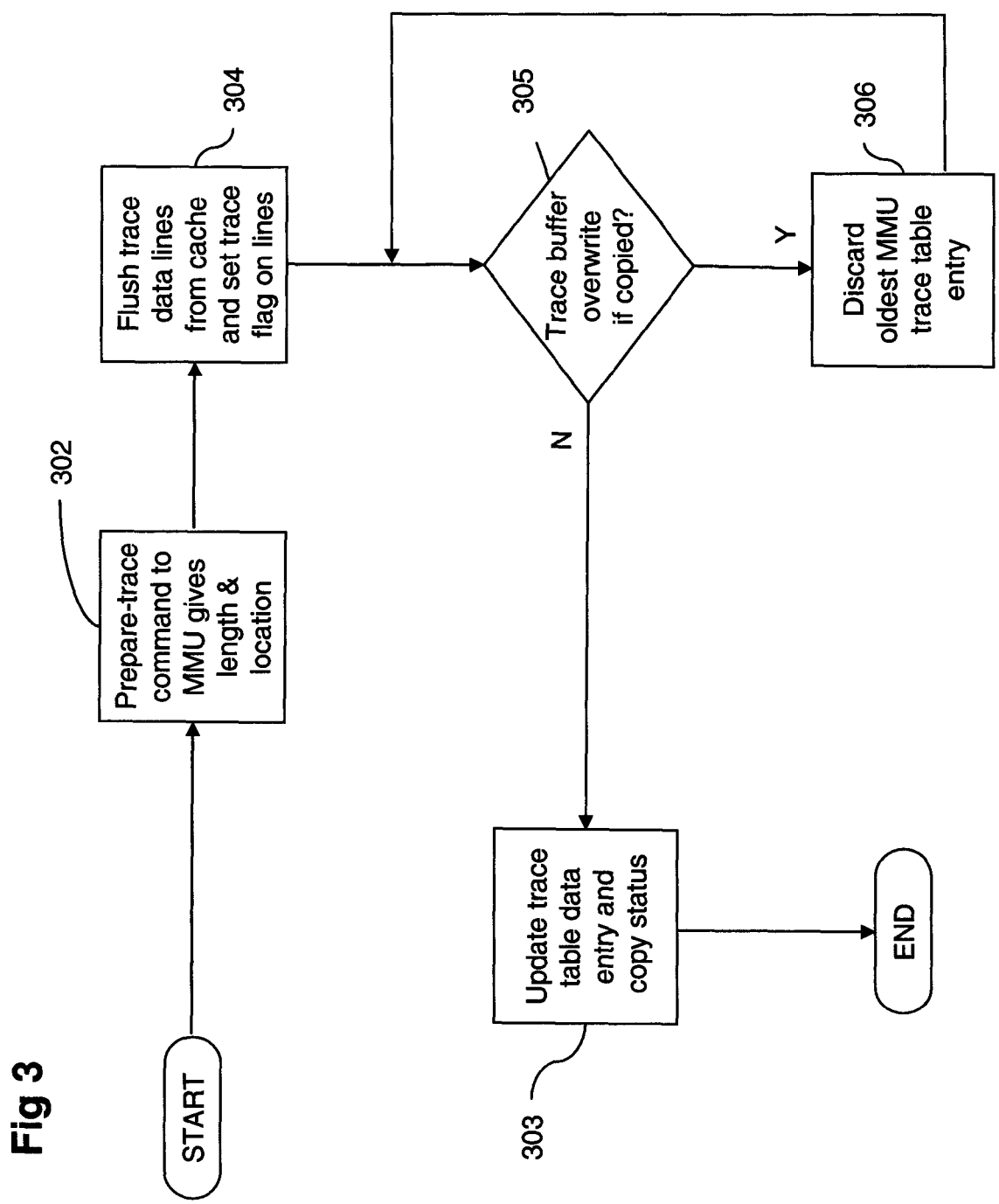
Figure 4:
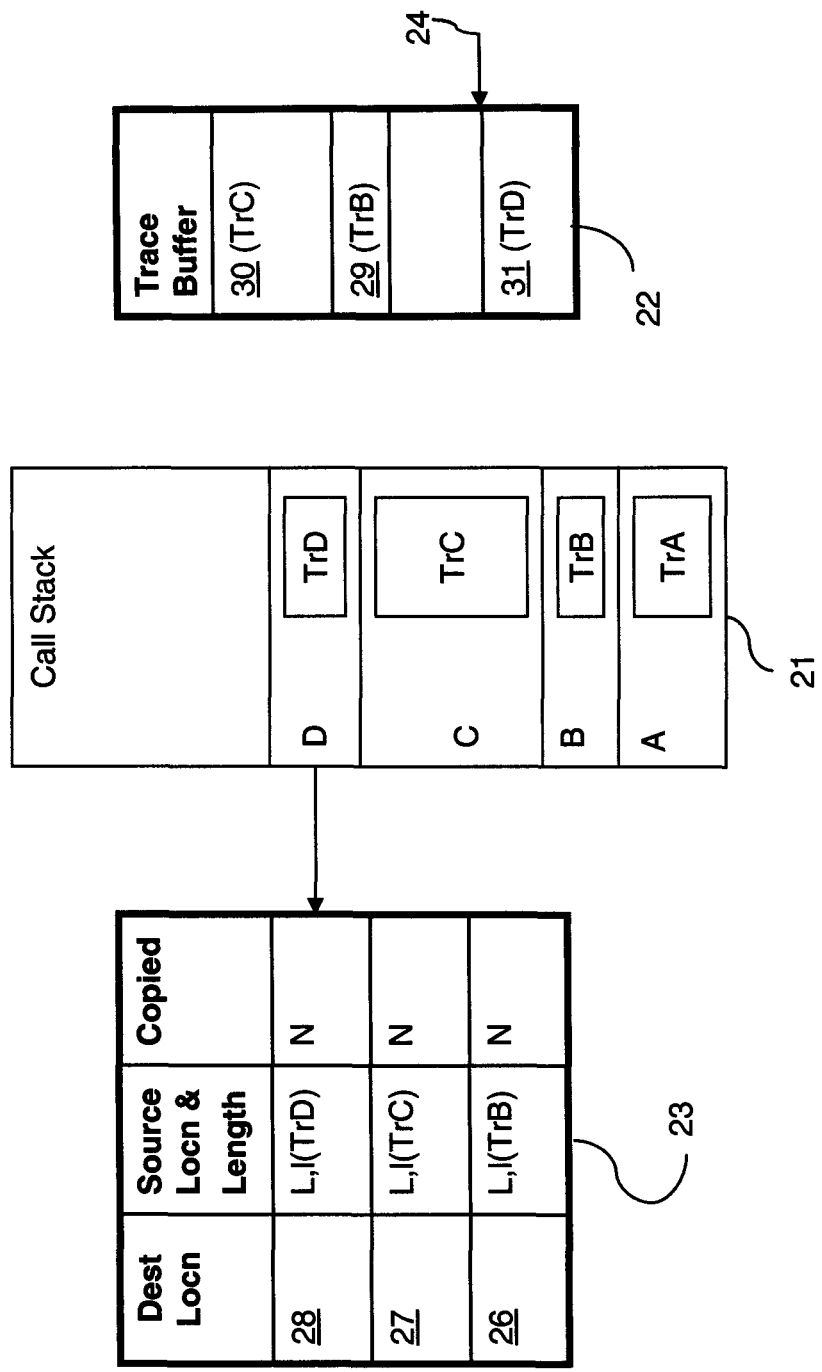
Figure 5:
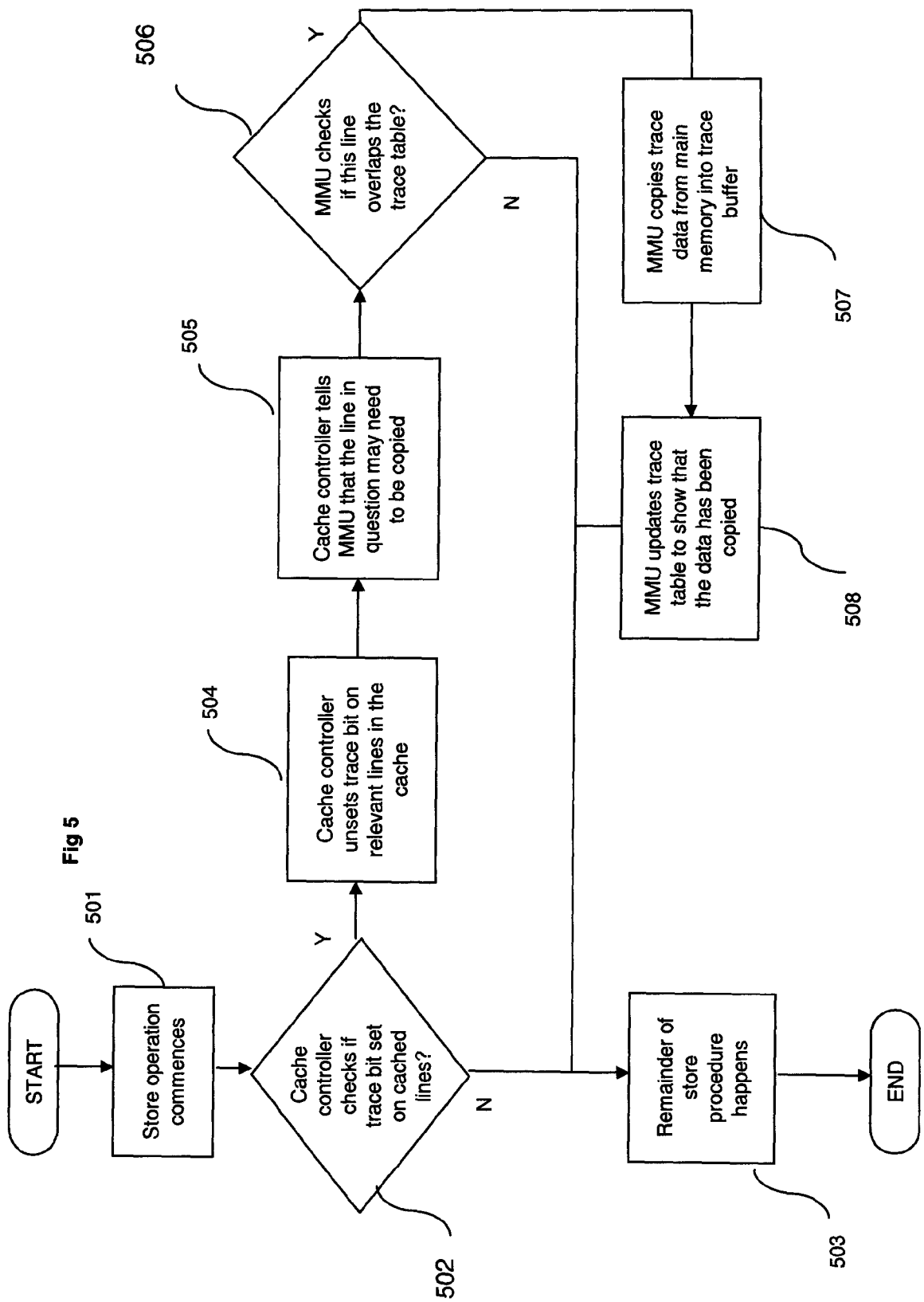
Figure 6:
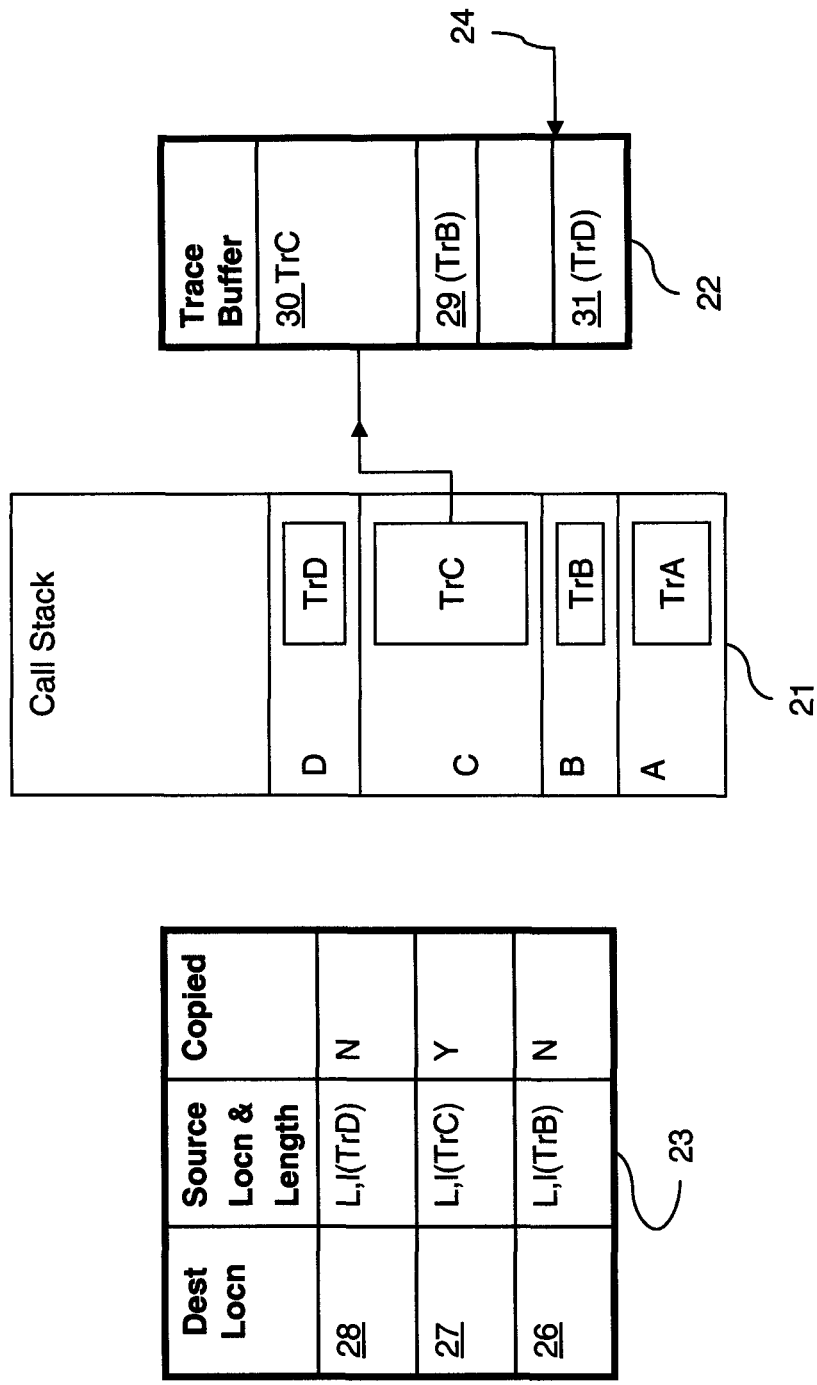
Figure 7:
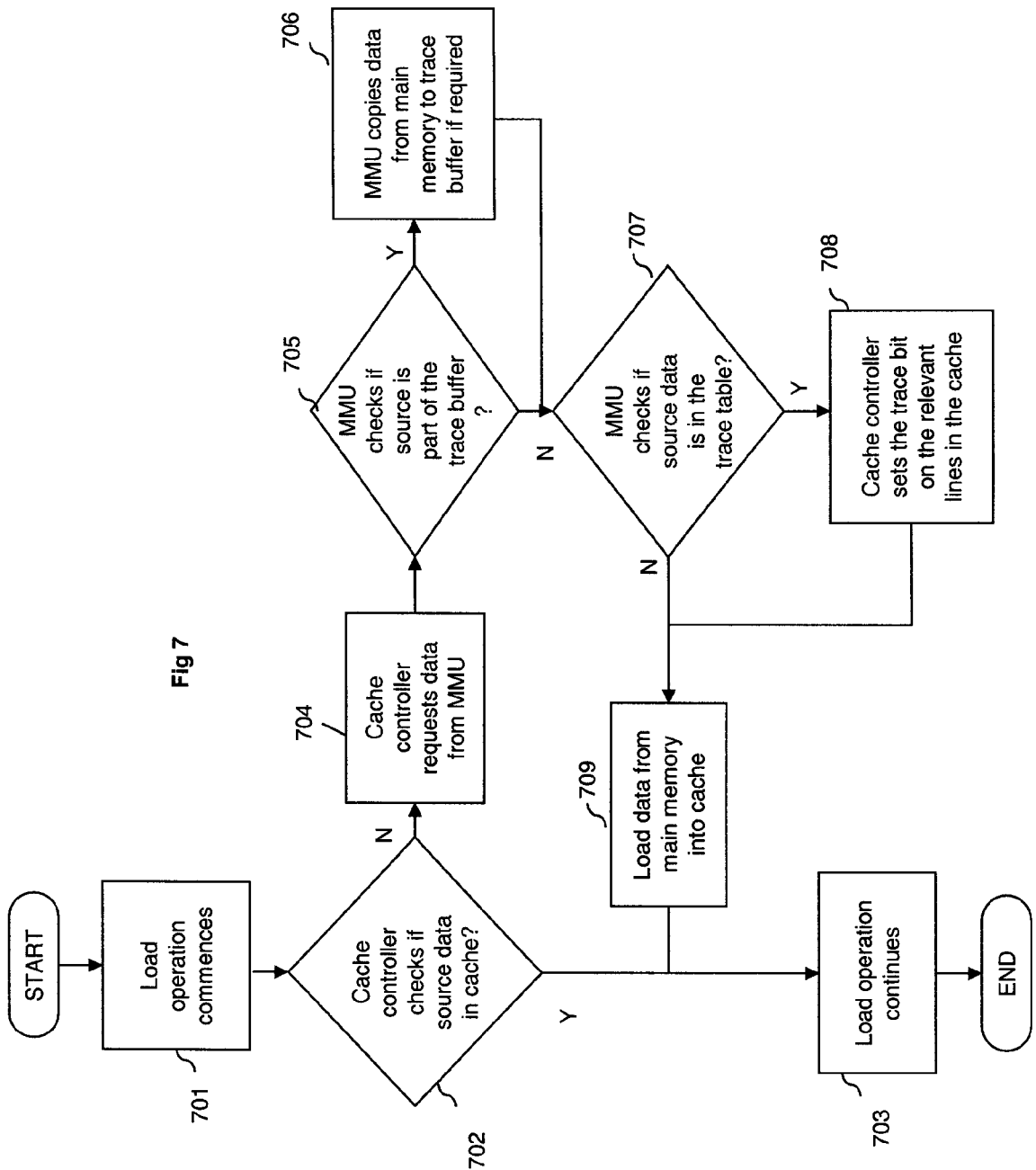
Figure 8:
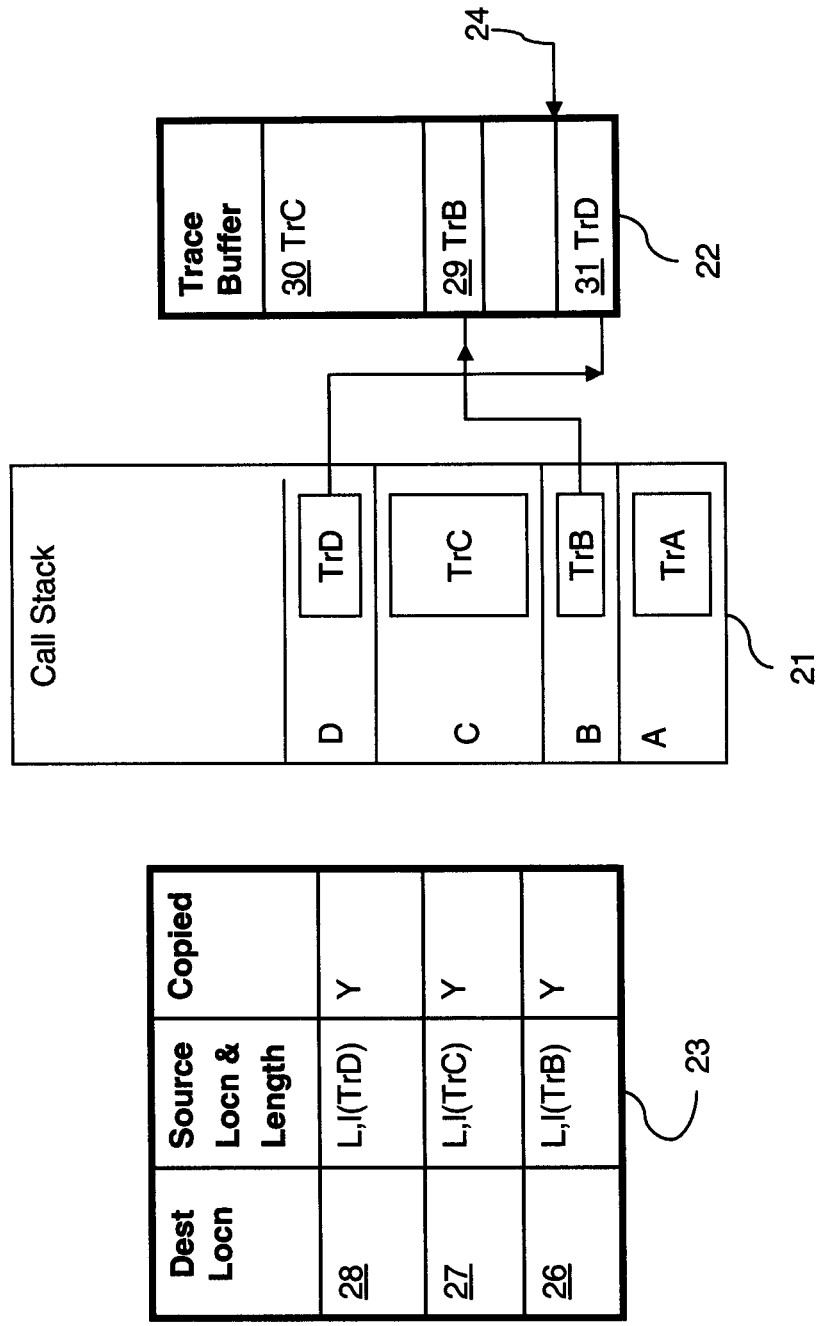

Having thus described the invention in general terms, reference will now be made to the accompanying drawings, which are not necessarily drawn to scale, and wherein:

FIG. 1 is a schematic block diagram of a data processing system in which a data tracing management system and method according to embodiments of the invention are implemented, the data processing system including a Memory Management Unit and System (Main) Memory;

FIG. 2 illustrates data structures, including a deferred trace list and trace buffer, created in the data processing system of FIG. 1, for implementing the data tracing management system and method according to embodiments of the present invention;

FIG. 3 is a flow diagram showing the generation and management of the trace list of FIG. 2;

FIG. 4 shows the data structures of FIG. 2 after the generation of further trace data;

FIG. 5 is a flow diagram showing the handling of a Store instruction by the MMU according to embodiments of the invention, in the data processing system of FIG. 1;

FIG. 6 shows the data structures of FIG. 4 after a Store instruction attempts to overwrite trace data as shown in FIG. 5;

FIG. 7 is a flow diagram showing the handling of a Load instruction by the MMU according to embodiments of the invention, in the data processing system of FIG. 1; and FIG. 8 shows the data structures of FIG. 6 after a request to Load trace buffer contents has been processed as shown in FIG. 7.

DETAILED DESCRIPTION OF THE INVENTION

The data processing system of FIG. 1, in which one embodiment of the invention can be implemented, comprises two parallel processors 10 and 11, consisting of central processing units (CPUs) 12 and 13 having respective caches 14 and 15. Although not explicitly shown in the drawing, each cache consists of computer memory and a cache controller to manage the use of said memory. These communicate with volatile main memory RAM 16, via a shared Memory Management Unit (MMU) 17. In turn, the main memory 16 is linked, via a storage control unit (not shown) to non-volatile storage in the shape of hard disk file 18. There is no particular significance in the choice of a parallel processor system, and embodiments of the invention would work equally well with a single processor.

The MMU performs the conventional functions of controlling the copying of data to and from main memory 16 via the caches. The MMU has two basic functions: "Store" and "Load". The Load function writes or copies data from main memory to cache for processing by the CPU and the Store function writes or copies data back from cache to main memory. It should be noted that caches operate atomically in so-called "lines" which are of greater capacity than individual (for example, 8 byte) registers. Thus, a change to the contents of only one register requires the entire line containing the relevant byte(s) to be present in the cache. The relevant byte(s) are then either extracted or changed by the CPU and, if changed, the modified line remains in cache until synchronised with the corresponding line of main memory. This may happen as a result of an operation known as "flushing" the cache.

An application program 20 of the kind having an inbuilt trace facility is stored in main memory 16. The program 20 includes two data structures in particular which are relevant to embodiments of the invention and which are shown in FIG. 2. These are the Call Stack 21 and a Trace Buffer 22, whose functions will be explained further below. Also shown is a Trace table 23, which is part of the MMU.

The Call Stack is a conventional program data structure created during execution of the program as various methods (or subroutines) are executed. Each method, such as A, B and C in FIG. 2 is allocated an area of storage in which each method records data it produced during execution which it may need to refer back to. The storage area of the first method to be called, method A, is at the base of the stack. As illustrated, it is assumed that method A calls method B, creating a storage area above that of A, and, in turn, method B calls method C, creating a storage area above that of B. This is just one simple example of a possible execution sequence. Subsequently, in the example, method C may return to the previous method B or call a further method D. Data recorded in the stack may be overwritten by the data's owning method if the data is no longer needed. Each method can use a different amount of storage space on the stack.

If the trace facility is enabled, then, at predetermined events in the execution of each method as defined by the trace program's configuration parameters, selected data items will be identified or created. These items of data are shown as TrA, TrB and TrC for the respective methods A to C.

Conventionally, these items of trace data would be copied to a wrap round (sometimes referred to as circular) trace buffer as they are generated, in response to Store (that is to say, write) instructions issued by the CPU causing the MMU to store the contents of TrA to TrC successively in the buffer. The conventional trace buffer has a current pointer to the next cell available for storing trace data which wraps round to the start when the buffer becomes full so that the first written entry will be overwritten by the first item to exceed the buffer capacity.

In FIG. 2, there is also a trace buffer 22 but it is not filled in the conventional way. For simplicity, in order to most easily describe the principles of embodiments of the present invention, only three storage cells (or regions) are shown in the trace buffer 22 of this example but it will be realised that many more would exist in a real system. The management of trace data according to embodiments of the present invention will now be described firstly with reference also to the flow diagram of FIG. 3.

When the program method under execution creates or identifies new trace data in the call stack, instead of writing the trace data immediately into the trace buffer 22, which would be achieved by a simple store instruction to the MMU, a new "Prepare-Trace" instruction causes the location "L" and length "l" of each new item of trace data to be passed firstly to the MMU in step 302 and subsequently recorded in the center column of trace table 23 in step 303 with an indication in the right hand column that the item of trace data has not yet been copied to the trace buffer. It should be noted that, in these steps, the locations are identified by virtual addresses. Thus, for example, the length and location "L,l (TrA)" of trace data TrA is recorded in the first (lower) cell of the centre column of the table, together with an indication "N", in the lower cell of the right hand column, that trace data TrA has not yet been copied to the trace buffer 22. However, this action effectively reserves a region 25 of the trace buffer for the data TrA, as indicated by "(TrA)" in parenthesis in trace buffer 22. In a lower cell 26 of the left hand column of trace table 23, there is recorded a "Destination Location" which comprises a range of addresses (or a start address plus length) which identifies the region 25.

Similarly, as shown in FIG. 2, further trace table entries are made for trace data TrB and TrC as they are generated by methods B and C and destination locations are recorded in cells 27 and 28 for further regions 29 and 30 of the trace buffer 22. However, as nothing is actually recorded in the trace buffer, the relatively heavy processing cost of loading the trace data into the trace buffer is deferred and the trace buffer 22 remains empty. The notional reservation of trace buffer regions for particular trace data is again indicated by the trace data item name in parenthesis and further illustrated by arrowed connectors from the corresponding destination location cells of the trace table. It will be noted that, as the trace data may vary in size, the reserved regions 25, 29 and 30 of the trace buffer vary correspondingly. As the trace buffer in this simple example, would become full if further items of data, beyond the three already mentioned, were copied into it, a virtual pointer 24 indicates the start of the trace buffer storage area as the start point to be reserved for the next generated trace data, which would overwrite the contents of the lowest portion, including region 25 of the trace buffer, as necessary to accommodate the next generated data.

For reasons which will become clear later, after the MMU receives the length and location of a trace data item, in step 304, the MMU flushes the line or lines in caches 14 and 15 in which the data is stored. This has the effect of ensuring that, thereafter, the trace data in main memory is up to date. The cache controller keeps a record of these lines by having an array of flags where each flag corresponds exactly to one line of cache memory, and the flags can either be in a set state or an unset state. The default is for the flag for a line to be unset, but the cache controller sets the flag for lines which contain data that has been marked for trace. This allows the cache controller to know which lines contain data which has been marked as trace data without having to reference the trace table 23 maintained by the MMU.

Assume now that, as shown in FIG. 4, a further method D is called and generates its own trace data TrD in the call stack 21. In step 305, it is determined that this data, if recorded, would cause the capacity of the trace buffer to be exceeded. This causes at least the oldest trace table entry L,l(TrA) to be discarded from trace table 23, in step 306, in favour of the more recent data, L,l(TrD), so that TrA is never copied into the trace buffer. The virtual pointer 24 is moved up the trace buffer to the end of a region 31 for accommodating TrD. In the illustrated example, TrD is smaller than TrA which means that TrD does not fully overwrite region TrA, as illustrated by the gap between regions 31 and 29 in FIG. 4. If TrD were larger than TrA, then TrD would overwrite some of region 29 as well and TrB would also be discarded. This situation would be detected in a second iteration through step 305.

The trace table 23 is again updated in step 303 to reflect the logical but still deferred changes to the trace buffer, as illustrated in FIG. 4. For clarity, the full connector lines from the destination location cells 26, 27 and 28 to the trace buffer are not shown but can be inferred from the contents of the trace table and trace buffer.

Of course, the copying of trace data generated by the program to the trace buffer cannot always be deferred indefinitely. Sooner or later, a program failure or other event of interest will be reached and a request will be generated to cause some or all of the current trace data in the trace buffer to be displayed or logged. However, since in the system of embodiments of the invention this data will not, in general, yet be in the trace buffer, this data will have to be copied to the trace buffer before the request can be satisfied. It is also possible that, independently of such a request for trace data, the program 20 may cause the main memory location of an item of trace data to be overwritten before the item of trace data has been copied to the trace buffer. Thus, embodiments of the invention provide for trace data to be copied to the trace buffer on the occurrence of either of these predefined events. How this is achieved will be explained further, below.

The case of overwriting trace data is dealt with as a subset of the general Store instruction to the MMU, and is illustrated in the flow diagram of FIG. 5. Broadly, in order to ensure trace data is copied to the trace buffer before being overwritten, it is necessary to check whether the destination of each store instruction holds any data that has been marked to be traced. If the destination of any store instruction holds any data that has been marked to be traced, then the current data at the destination must first be copied to the trace buffer before the requested store operation can be allowed to proceed. If the destination of the store instructions does not hold any data that has been marked to be traced, no copying to the trace buffer is necessary before the store operation proceeds.

In more detail, when one of the CPUs issues a Store instruction to the MMU, the data to be stored is provided to the cache in step 501. In step 502, the cache controller checks to see if the destination line has had a flag set to indicate that the destination line contains data which has been marked for trace. If this is not the case, then the rest of the Store operation continues. If the line does contain data to be traced, then the cache controller will unset the flag (step 504) and notify the MMU that the line of data may need to be copied (step 505). In step 506, the MMU checks to see whether this line still contains data which has been marked for trace according to the trace table 23. If the line does, the data is copied from main memory to the trace buffer in step 507. This can happen in parallel with other parts of the Store operation. The MMU updates the trace table in step 508 to record that the data has been copied.

The effect of the process of FIG. 5 on the various data structures is illustrated in FIG. 6 which shows one item of trace data TrC, which it is assumed was about to be overwritten, physically copied into trace data TrC's reserved region 30 in trace buffer 22. The presence of actual trace data is indicated by the lack of parentheses around TrC in the top cell. The location of the correct destination region in the trace buffer is obtained from the corresponding destination location cell 27 in the trace table. The fact of copying is indicated by changing the corresponding "copied" column entry of the trace table to "Y".

The other predefined event which causes updating of the trace buffer is a request for the trace buffer content to be logged or displayed, usually at the point of program failure. This type of request is dealt with as a subset of a Load request to the MMU and is illustrated in the flow diagram of FIG. 7.

When one of the CPUs issues a load instruction, the destination to which the required data is to be loaded is provided in step 701 as the start address and length (note that this only copies out one data line of the trace, so this flowchart process will be repeated until all trace has been processed).

The CPU will request the memory from the cache. In step 702 the cache controller first checks to see whether the memory is already in the cache. If the memory is already in the cache, then the Load operation is allowed to continue (step 703.)

If the memory is not in the cache, then the cache controller will send a request to the MMU for the data to be loaded out of main memory (step 704). In step 705 the MMU checks whether the address and length of the data requested overlap with the trace buffer 22. If this is the case, then the MMU must copy the trace data into the trace buffer according to table 23 before servicing the request (step 706.) In step 707, the MMU then performs the further check to see whether the requested address and length overlap with any source locations and lengths in table 23. If this is the case, the MMU tells the cache controller that the cache controller must set the trace flag for the relevant lines on which the data resides (step 708.) In all these cases, the MMU loads the data from main memory into the cache (709), and the load operation is allowed to complete (step 703.)

The effect of the process of FIG. 7 on the data structures is shown in FIG. 8. Trace data TrC had already been copied to trace buffer 22, as a result of the store operation of FIGS. 5 and 6. However, trace data TrB and TrD had not and so would be copied by step 706, after which trace table 22 would be filled with all the most recent actual trace data, as shown.

A final aspect of the described system is that the trace buffer may also be updated by the MMU to store real trace data at any time the MMU is idle. Combined with the general principle of deferring copy when the MMU is busy with higher priority tasks, the trace data management system described offers an efficient tracing technique with minimum impact on performance.

As will be appreciated by one skilled in the art, embodiments of the invention may be embodied as a system, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. As is apparent from the foregoing description, the computer readable medium may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described herein with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of managing tracing of data of interest generated sequentially during execution of a computer program in a data processing system comprising a processor and main memory, the method comprising:
   identifying a location and a length of one or more units of data of interest operable to be stored in main memory during execution of the program;
   recording a logical assignment of each such unit to a slot in a wrap around trace buffer in main memory;
   discarding the recorded assignments of one or more data units of interest whenever a capacity of the trace buffer would be exceeded so that such units are never copied to the trace buffer; and
   copying logically assigned data units of interest to their respective slots in the trace buffer in response to one or more predefined events.

2. The method as claimed in claim 1 wherein one of said one or more predefined events is an indication that the main memory location of a logically assigned data unit of interest is about to be overwritten.

3. The method as claimed in claim 1 wherein one of said one or more predefined events is a request to read the trace buffer.

4. The method as claimed in claim 1 in which the data processing system further comprises a Memory Management Unit ("MMU") which controls the copying of data to and from the main memory, wherein the method further comprises:
   copying, by the MMU, logically assigned data units of interest to the trace buffer without waiting for said one or more predefined events, if the MMU is otherwise idle.

5. The method as claimed in claim 1 in which the data processing system further comprises a Memory Management Unit which controls the copying of data to and from the main memory and at least one cache associated with the processor, wherein the method further comprises:
   flushing any lines in the cache which contain the data that will be stored in the trace buffer to main memory and marking those lines such that such data will not be overwritten before such data is copied to the trace buffer.

6. A data tracing management system for managing tracing of data of interest generated sequentially during execution of a computer program in a data processing system comprising a processor, main memory, and a memory management unit ("MMU") which controls copying of data to and from the main memory; the data tracing management system including:
   means for identifying a location and a length of one or more units of data of interest operable to be stored in main memory during execution of the program;
   a wrap around trace buffer in main memory;

trace assignment means within the MMU responsive to a trace instruction from the processor to record a logical assignment of each such unit to a slot in said wrap around trace buffer;

means for discarding the recorded assignments of said data units of interest whenever a capacity of the trace buffer would be exceeded so that such units are never copied to the trace buffer; and means for copying logically assigned data units to their respective slots in the trace buffer in response to one or more predefined events.

7. The system as claimed in claim 6 wherein one of said one or more predefined events is an indication that the main memory location of a logically assigned data unit of interest is about to be overwritten.

8. The system as claimed in claim 6 wherein one of said one or more predefined events is a request to read the trace buffer.

9. The system as claimed in claim 6 wherein the MMU is arranged to copy logically assigned data units of interest to the trace buffer without waiting for said one or more predefined events, if the MMU is otherwise idle.

10. The system as claimed in claim 6 in which the data processing system further comprises at least one cache associated with the processor and cache control means arranged to flush any lines of the cache which contain the data that will be stored in the trace buffer to main memory and mark those lines so that such data will not be overwritten before such data is copied to the trace buffer.

11. A computer program product for managing tracing of data of interest generated sequentially during execution of an application program in a data processing system comprising a processor and main memory, the computer program product comprising at least one computer-readable storage medium having computer-readable program code stored therein, the computer-readable program code comprising:

computer-usable program code for identifying a location and a length of one or more units of data of interest operable to be stored in main memory during execution of the program;

computer-usable program code for recording a logical assignment of each such unit to a slot in a wrap around trace buffer in main memory;

computer-usable program code for discarding the recorded assignments of said data units of interest whenever a capacity of the trace buffer would be exceeded so that such units are never copied to the trace buffer; and computer-usable program code for copying logically assigned data units of interest to their respective slots in the trace buffer in response to one or more predefined events.

12. The computer program product as claimed in claim 11 wherein one of said one or more predefined events is an indication that the main memory location of a logically assigned data unit of interest is about to be overwritten.

13. The computer program product as claimed in claim 11 wherein one of said one or more predefined events is a request to read the trace buffer.

14. The computer program product as claimed in claim 11 in which the data processing system further comprises a Memory Management Unit ("MMU") which controls the copying of data to and from the main memory, wherein the computer program product further comprises:

computer-usable program code for copying, by the MMU, logically assigned data units of interest to the trace buffer without waiting for said one or more predefined events, if the MMU is otherwise idle.

15. The computer program product as claimed in claim 11 in which the data processing system further comprises a Memory Management Unit which controls the copying of data to and from the main memory and at least one cache associated with the processor, wherein the computer program product further comprises:

computer-usable program code for flushing any lines in the cache which contain the data that will be stored in the trace buffer to main memory and marking those lines such that such data will not be overwritten before such data is copied to the trace buffer.

\* \* \* \* \*